United States Patent
Cordray et al.

(10) Patent No.: US 6,662,026 B1
(45) Date of Patent: Dec. 9, 2003

(54) APPARATUS AND METHOD FOR DETECTING AND HANDLING ACCIDENTAL DIALING ON A MOBILE COMMUNICATIONS DEVICE

(75) Inventors: David A. Cordray, Austin, TX (US); Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 09/671,057

(22) Filed: Sep. 28, 2000

(51) Int. Cl.[7] .............................. H04M 1/00; H04B 1/38
(52) U.S. Cl. ....................... 455/567; 455/406; 455/407; 455/343.4
(58) Field of Search ................................. 455/406, 407, 455/567, 418, 550, 564, 343.4; 379/201.01, 201.1, 204.1, 207.02

(56) References Cited

U.S. PATENT DOCUMENTS

| 4,933,963 A | * | 6/1990 | Sato et al. ..................... 379/58 |
| 4,996,715 A | * | 2/1991 | Marui et al. ................... 455/33 |
| 4,998,271 A | | 3/1991 | Tortola et al. ................. 379/32 |
| 5,045,839 A | * | 9/1991 | Ellis et al. .................... 340/539 |
| 5,524,274 A | * | 6/1996 | Takahashi et al. ............ 455/34.2 |
| 5,592,529 A | | 1/1997 | Linsker ......................... 379/32 |
| 5,796,789 A | | 8/1998 | Eftechiou ...................... 379/35 |
| 5,978,470 A | | 11/1999 | Shaffer et al. ................ 379/377 |

* cited by examiner

Primary Examiner—Lee Nguyen
Assistant Examiner—Tuan Tran
(74) Attorney, Agent, or Firm—Duke W. Yee; Marilyn Smith Dawkins; Stephen J. Walder, Jr.

(57) ABSTRACT

An apparatus and a method is presented for detecting the accidental dialing of telephone numbers on a mobile communications device. Accidental dialing is typically caused by pressing a redial button or a speed dial button. The system works by monitoring the outgoing and incoming voice levels in order to detect an absence of conversation in both directions for a specified time period. An alarm system is activated if an absence of conversation is detected. The alarm system sends a unique audio signal to the earpiece of the mobile communications device and waits for a response. The response might be pressing a particular key sequence or simply resuming the conversation. If a response is not detected after a short period of time, then the telephone call is automatically terminated. If a response is received, then, depending on user preferences, the monitoring system continues to function or can be disabled for the duration of the phone call.

33 Claims, 3 Drawing Sheets

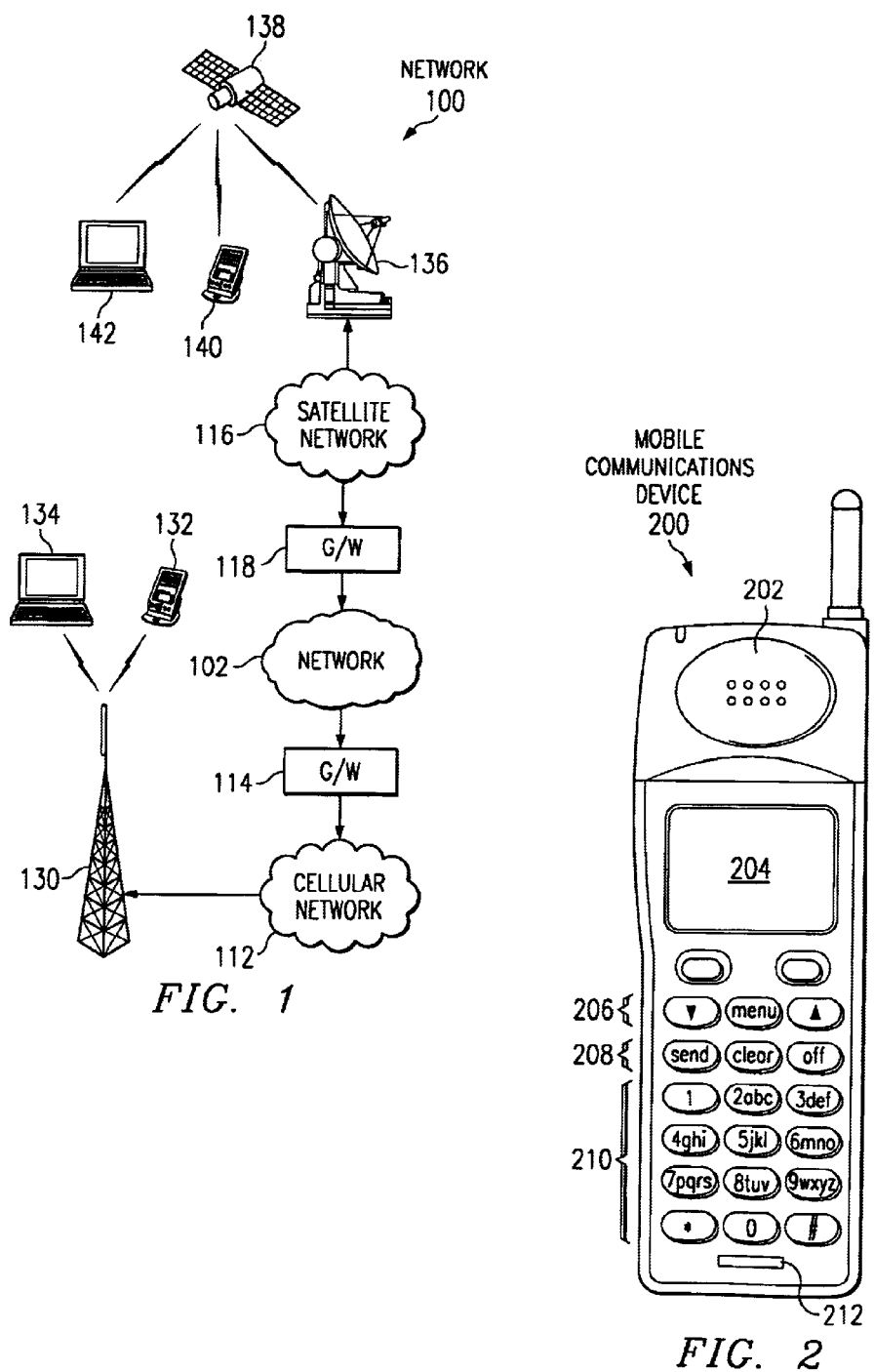

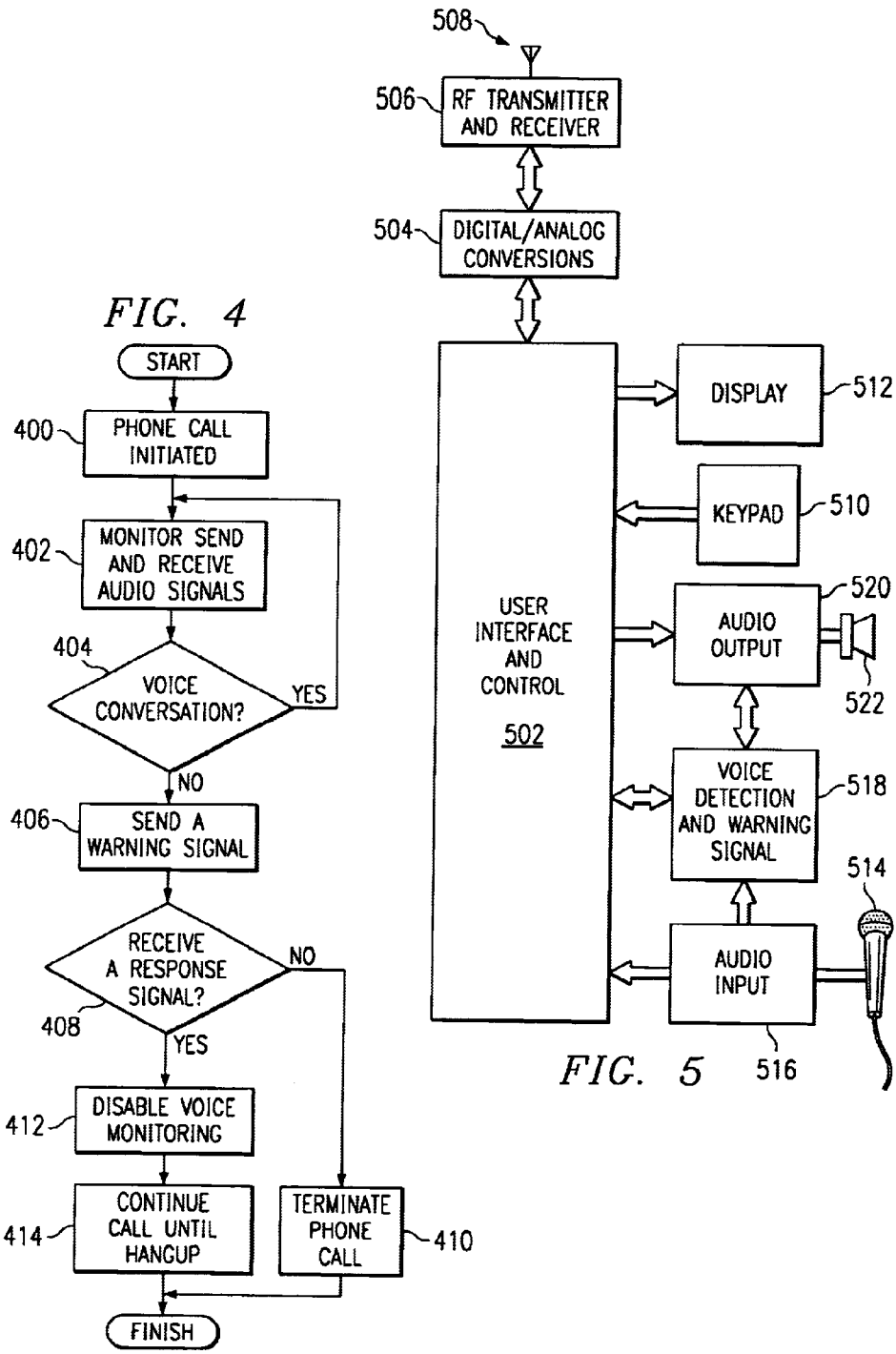

APPARATUS AND METHOD FOR DETECTING AND HANDLING ACCIDENTAL DIALING ON A MOBILE COMMUNICATIONS DEVICE

BACKGROUND OF THE INVENTION

1. Technical Field

The present invention relates generally to an improved dialing method on a mobile communications device and in particular to an apparatus and a method for handling accidental dialing. Still more particularly, the present invention provides an apparatus and a method for sending an alarm to the caller if accidental dialing is suspected and terminating the call if no response is received.

2. Description of the Related Art

Modern mobile communications devices have one key dialing or redialing features that make placing calls very convenient. However, this convenience has the danger of accidentally placing calls by pressing a key unintentionally, such as when the phone is being carried on a belt or in a purse. If the person at the other end picks up this call, he is powerless to alert the user about the error since the user is not listening to the phone. The result is that the user is charged for a lengthy call that was never intended.

One solution is to have a "key guard". This means the user must dial a sequence of numbers before the phone is activated. Typically this feature must be manually enabled and, if this is not done, then there is no protection. Even if there is automatic activation of the key guard after the last call is completed, there can be problems. If the time between the end of a call and reactivation of the keyguard is too short, then the user is required to go through the key guard again before initiating another phone call. If the time between the end of a call and reactivation of the keyguard is too long, accidental dialing may occur.

Another solution is a flip-up pad that physically covers the keypad of the cellular telephone. With such flip-up pads the keypad of the cellular telephone is only accessible when the flip-up pad is flipped to a position where it no longer covers the keypad. Furthermore, with some flip-up pads, the cellular telephone is only active when the flip-up pad has been opened for use. The use of a flip-up pad, while physically preventing accidental dialing when in a position covering the keypad, adds to the bulkiness of the telephone, requires additional manipulation from a user before a telephone call may be initiated, and may be inconvenient to some users of the cellular telephone.

Therefore, it would be advantageous to have an apparatus and a method to detect accidental phone calls and to take corrective actions to prevent excessive, unwanted phone charges.

SUMMARY OF THE INVENTION

An apparatus and a method is presented for detecting the accidental dialing of telephone numbers on a mobile communications device. Accidental dialing is typically caused by pressing a redial button or a speed dial button. The system works by monitoring the outgoing and incoming voice levels in order to detect an absence of conversation in both directions for a specified time period. An alarm system is activated if an absence of conversation is detected. This signifies that the phone connection is not being attended by anyone, i.e. it is an unattended communication due to perhaps an accidental dialing or due to the failure to adequately terminate a previously attended communication.

The alarm system sends a unique audio signal to the earpiece or other audio output device of the mobile communications device and waits for a response. The response might be pressing a particular key sequence or simply resuming the conversation. If a response is not detected after a short period of time, then the telephone call is automatically terminated. If a response is received, then, depending on user preferences, the monitoring system continues to function or can be disabled for the duration of the phone call.

In addition, the present invention provides a mechanism by which a called party may initiate a key sequence which generates a sequence of tones that are received by the phone that was accidentally dialed, to thereby output an audio alarm signal. If a response to the alarm signal is not received within a preset period of time, the telephone call is automatically terminated.

As a further embodiment of the present invention, a mechanism is provided by which emergency telephone numbers, which are stored in the memory of the telephone, do not activate the accidental dialing detection and handling features of the present invention. Thus, for example, if the telephone has emergency telephone numbers associated with a local police department, fire department, hospital, 911 and the like, these telephone numbers, when dialed, disable the accidental dialing detection and handling features of the present invention. By disabling the accidental dialing detection and handling features of the present invention in emergency situations, the possibility of automatically terminating the telephone call because the calling party is not able to converse is avoided.

As an even further embodiment of the present invention, a mechanism is provided for detecting tones associated with facsimile and computer modem transmissions. When these tones are detected by the present invention, the accidental dialing detection and handling features of the present invention are disabled in order to avoid erroneous termination of the facsimile and/or computer transmissions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a system diagram illustrating a telephony system in which the present invention may be implemented;

FIG. 2 is a diagram showing the major exterior components of a mobile communications device in which the present invention may be implemented;

FIG. 4 is a flowchart illustrating the accidental dialing alarm system in accordance with a preferred embodiment of the invention; and FIG. 5 is a block diagram showing the major interior components of a mobile communications device in accordance with a preferred embodiment of the invention.

DETAILED DESCRIPTION OF THE PREFERRED EMBODIMENT

Figure 3:
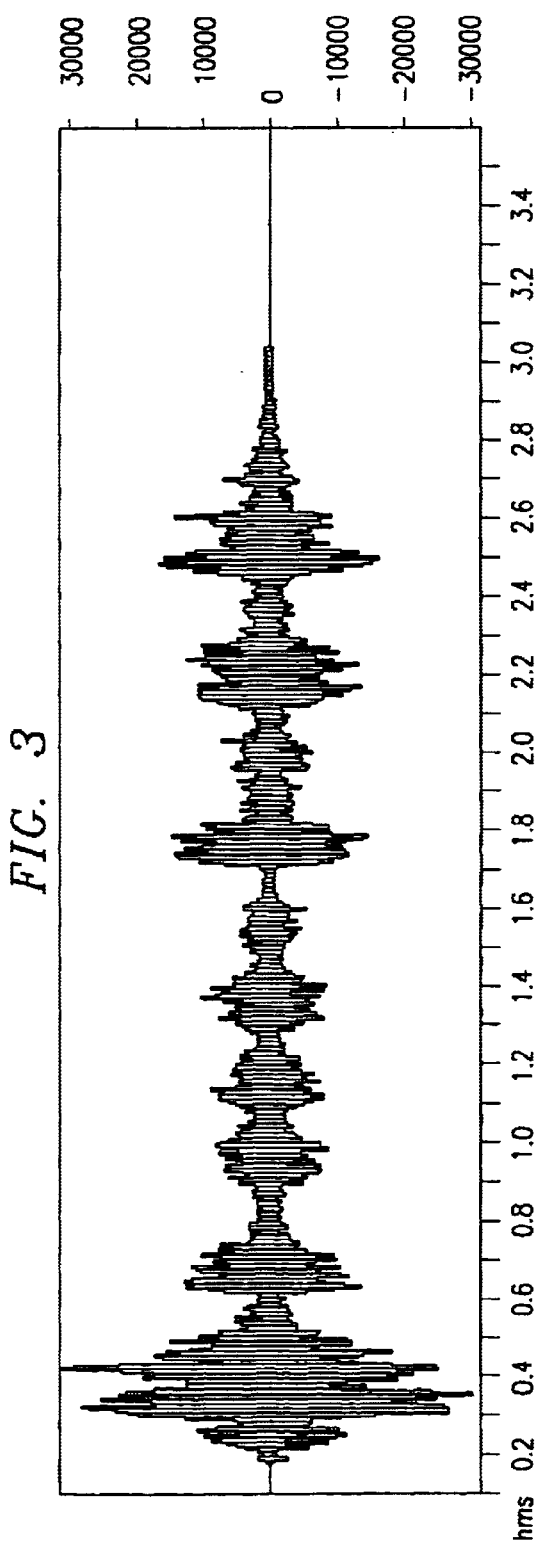
FIG. 3 is a picture of a waveform of a typical voice conversation.

With reference now to the figures, and in particular with reference to FIG. 1, a system diagram illustrating a telephony system in which the present invention may be implemented is depicted. Telephony system 100 is a plurality of interconnected heterogeneous networks in which the present invention may be implemented. As illustrated, telephony system 100 contains a network 102, a cellular wireless network 112, and a satellite communication network 116. Networks 102, 112, and 116 may include land-line connections, such as wire or fiber optic cables, and/or wireless connections made through, for example, radio or infrared communication links with base station or satellite transceivers.

Cellular network 112 supports wireless communications with terminals operating in its service area (which may cover a city, county, state, country, etc.). As is known, cellular network 112 includes a plurality of towers, e.g., 130, that each service communications within a respective cell. Cellular network 112 couples to network 102 via gateway 114.

Wireless terminals that may operate in conjunction with cellular network 112 include wireless handsets 132 and wirelessly enabled laptop computers 134, for example. Wireless handsets 132 could be, for example, personal digital assistants, wireless or cellular telephones, or two-way pagers. Satellite network 116 includes at least one satellite dish 136 that operates in conjunction with a satellite 138 to provide satellite communications with a plurality of terminals, e.g., laptop computer 142 and satellite handset 140, a two-way pager (not shown), or the like. Satellite network 116 may be serviced by one or more geosynchronous orbiting satellites, a plurality of medium earth orbit satellites, and/or a plurality of low earth orbit satellites. In any case, satellite network 116 services voice and data communications and couples to network 102 via gateway 118.

The present invention is primarily useful for mobile communications devices, but could also be used with any calling device with audio capability where accidental dialing is possible. For example, the present invention may be used with modem enabled computer devices, portable digital devices, and the like. For purposes of illustration, the preferred embodiments of the present invention will be described with reference to a mobile communications device, such as a cellular telephone.

FIG. 2 shows the major exterior components of a mobile communications device 200 in which the present invention may be implemented. The user listens in earpiece 202 and speaks into microphone 212. Display 204 shows information, which the user can manipulate using menu control buttons 206. Call control buttons 208 vary between phones, but most phones have a send or talk button. Accidentally pushing this button will result in an unintended phone call. Keypad 210 contains the alphanumeric keys as well as the * and # keys. FIG. 2 is only representative of a typical mobile communication device and, as will be appreciated by one of ordinary skill in the art, variations in design and layout are possible.

FIG. 3 shows a waveform of a typical voice conversation. The speaker is talking for the first 2.7 seconds and then silent after that. In a typical environment for mobile communications device use, there may be some background noise after the speaker stops talking. However, a microphone in a mobile communications device is designed to pick up sounds from a very close distance, a matter of inches, and be less sensitive to distant sounds, as found in the background. The mobile communications device of the present invention is intelligent enough to determine the ambient level for a particular conversation in a particular environment by detecting highs and lows (within certain bounds). For example, various thresholds may be established for identifying background noise, i.e. ambient sound. When an input level through the microphone is below this threshold, it is determined that a user is not providing any input and that the only input is from background noise. If the input is above the threshold, it is determined that a user is speaking into the microphone and thus, a conversation is occurring. The actual thresholds may be determined based on empirical data for previous voice communications. Alternatively, more complex mechanisms for identifying background noise may be used without departing from the spirit and scope of the present invention.

Telephone conversations are bidirectional, so it is not unusual for one speaker to be silent while listening to the other speaker. Therefore, both the audio being sent and the audio being received need to be considered. If both signals are below the prescribed decibel level for the predetermined time duration, then it is more likely that the phone conversation is due to accidental dialing.

FIG. 4 is a flowchart illustrating an exemplary operation of the accidental dialing alarm system in accordance with a preferred embodiment of the invention. After the phone call is initiated (step 400), the accidental dialing system monitors both the outgoing and incoming audio signals for the presence of voice conversation (step 402). If voice conversation is detected in either direction (step 404: yes), then the monitoring continues (return to step 402). If the decibel level drops below a specified level in both directions for a predetermined duration (step 404: no), then the alarm system is activated.

It would be premature to terminate a phone call automatically during a period of silence. Rather, a distinctly recognizable signal is sent to the earpiece or other audio output device in the mobile communications device (step 406). An alternative alarm signal might be vibrating the mobile communications device, illuminating an indicator, or any combination of tactile, visual and/or audible alarms.

If the user is still actively using the device, he can push a button or combination of buttons or, in some other way, indicate continued use in order to disable the monitoring system. An alternative method of indicating continuing use may be to simply start talking to indicate the phone conversation is still going on.

If a response to the alarm signal is received (step 408: yes), then the voice monitoring system will be disabled (step 412) and the phone conversation continues until the caller hangs up (step 414). If no response signal is received (step 408: no), then the phone conversation will be terminated (step 410). The response signal might take the form of pressing a particular key sequence or simply resuming the conversation.

Several alternative strategies are possible to that shown in FIG. 4. For example, a response to the warning signal (step 408: yes) might simply continue the voice monitoring (return to step 402) and not disable the system. Both approaches might be possible, such as detection of a voice causes a return to the monitoring system and detection of a code signal based on pressing buttons causes the system to be disabled. During setup of the mobile communications device, it is possible for the user to specify individual preferences, such as whether the alarm system is enabled, the length of duration before activation, the type of response signal to be recognized, and so forth.

FIG. 5 is a block diagram that shows the major interior components of mobile communications device 500 in accordance with a preferred embodiment of the invention. The user interface and control circuitry 502 sends and receives signals from the digital/analog conversion circuits 504, which in turn sends and receives signals from the RF transmitter and receiver circuits 506. The wireless signals are transmitted and received via antenna 508. User interaction is primarily based on input at keypad 510 and output displayed as messages on display 512. Although not shown on FIG. 5, the battery and associated circuitry powers the mobile communications device.

The present invention interacts directly with the audio circuitry. The user speaks into microphone 514 that feeds the signal to audio input circuit 516. Voice detection circuit 518 monitors both the incoming audio from the user and voice of the recipient of the call via audio output 520. If conversation is not detected in either direction after a specified time period, circuitry 518 generates a warning signal that is sent to audio output 520. Audio output 520 feeds this warning signal to earpiece 522. If the user responds, either through keypad 510 or microphone 514, then the phone call continues. But, if no response is detected after a specified period of time, it is assumed the call is the result of accidental dialing and the call is terminated.

The above description illustrates the basic accidental dialing monitoring provided by the present invention. A number of enhancements to this basic monitoring may be provided to make the present invention more versatile. Some of these enhancements will be described hereafter. Others will become apparent to those of ordinary skill in the art in view of the above and following descriptions.

In an alternative embodiment, the accidental dial monitoring apparatus and method of the present invention is enhanced to recognize when an emergency communication connection has been attempted. For example, the mobile communication device of the present invention may store one or more emergency numbers in a memory associated with the mobile communications device. For instance, known cellular telephones are programmable with a plurality of quick dial telephone numbers. These quick dial telephone numbers may further include telephone numbers designated as emergency telephone numbers, such as 911, police, fire department, and hospital telephone numbers.

With the present invention, when the mobile communication device is activated by dialing a telephone number, a check is first made against the emergency telephone numbers stored in memory. If the telephone number dialed is one of the emergency telephone numbers stored in memory, the accidental dial monitoring features of the present invention are disabled. This is especially useful in the case of a user of the mobile communication device being able to dial the telephone number but not be able to conduct a telephone conversation because of incapacity due to a medical condition or criminal activity.

In another enhanced embodiment of the present invention, the accidental dial monitoring feature of the present invention may be configured to recognize facsimile and modem based transmissions. As is generally known in the art, facsimile and modem transmissions use various audible tones to transmit data signals across land-line/cellular telephone based communication links. These tones are recognizable by other facsimile and modem communication devices and are used to perform a handshake between the devices to thereby enable the transfer of data between the devices.

The present invention provides a mechanism by which these tones are recognized by the accidental dial monitoring apparatus and method of the present invention to thereby disable the accidental dial monitoring. With the present invention, basic modem function can be added to the telephone to implement this feature. Modems are designed to recognize the answer tones sent by calling modems and to respond accordingly. The telephone of the present invention may use such ability to easily recognize a modem answer tone being transmitted or received. Disabling the accidental dial monitoring eliminates the possibility that the accidental dial monitoring of the present invention may interrupt a data transmission from the mobile communication device erroneously. In addition to the above, if the telephone is enabled with speed dial or redial buttons, these functions may be disabled when transmission using facsimile or modem capabilities of the telephone is being performed.

Thus, the present invention provides a mechanism by which accidental dialing of a communication device is monitored and indicated to a user of the communication device. The accidental dial monitoring apparatus and method of the present invention avoids requiring additional physical devices to block accidental dialing, which may be cumbersome and awkward to use, and eliminates the inconvenience of known keyguard features. In addition, the present invention provides a mechanism by which intelligence in the accidental dial monitoring is used to recognize when emergency telephone calls, facsimile and modem transmissions have been initiated to thereby disable the accidental dial monitoring to avoid possible erroneous interruption of these communications.

The description of the present invention has been presented for purposes of illustration and description but is not intended to be exhaustive or limited to the invention in the form disclosed. Many modifications and variations will be apparent to those of ordinary skill in the art. For example, the warning signal might be a flashing light on the mobile communications device. The embodiment was chosen and described in order to best explain the principles of the invention and the practical application, and to enable others of ordinary skill in the art to understand the invention for various embodiments with various modifications as are suited to the particular use contemplated.

What is claimed:

1. A method in a communications device for detecting an unattended communication, the method comprising the steps of:

initiating communication with a remote communication device;

monitoring at least one of an input and an output of the communication device;

detecting an absence of the at least one of an input and an output;

activating an alarm signal based on the detection of an absence of the at least one of an input and an output;

monitoring for a response to the alarm signal; and terminating the communication while maintaining a current state of power to the communication device if no response to the alarm signal is received.

2. The method of claim 1, wherein the specified time is predefined based on user preferences.

3. The method of claim 1, wherein the alarm signal is at least one of a unique audio signal output via one of an earpiece and an audio output device of the communications device.

4. The method of claim 1, wherein a recognized response to the alarm signal comprises at least one of pressing a particular key or key sequence on the communications device and speaking into the input of the communications device.

5. The method of claim 1, wherein if a response to the alarm signal is received, the monitoring of the at least one of an input and an output of the communications device is disabled.

6. The method of claim 1, wherein monitoring the at least one of an input and an output of the communications device includes monitoring a microphone of the communications device for voice input by a user.

7. A method in a communications device for detecting an unattended communication, the method comprising the steps of:
   monitoring at least one of an input and an output of the communications device;
   detecting an absence of the at least one of an input and an output; and
   activating an alarm signal based on the detection of an absence of the at least one of an input and an output, wherein monitoring the at least one of an input and an output of the communications device includes monitoring an earpiece for a voice output by a called party.

8. A method in a communications device for detecting an unattended communication, the method comprising the steps of:
   monitoring at least one of an input and an output of the communications device;
   detecting an absence of the at least one of an input and an output;
   activating an alarm signal based on the detection of an absence of the at least one of an input and an output;
   determining if an activation of the communications device includes an input of an emergency number; and
   disabling the monitoring, detecting and activating steps if the activation of the communications device does include the input of an emergency number.

9. A method in a communications device for detecting an unattended communication, the method comprising the steps of:
   monitoring at least one of an input and an output of the communications device;
   detecting an absence of the at least one of an input and an output; and
   activating an alarm signal based on the detection of an absence of the at least one of an input and an output, wherein monitoring the at least one of an input and an output includes determining if the at least one of an input and an output includes a data transmission, and disabling the monitoring, detecting and activating steps if the at least one of an input and an output includes a data transmission.

10. An apparatus for detecting an unattended communication, comprising:
    means for initiating communication with a remote communication device;
    means for monitoring at least one of an input and an output of the apparatus;
    means detecting an absence of the at least one of an input and an output; and
    means for activating an alarm signal based on the detection of an absence of the at least one of an input and an output;
    means for monitoring for a response to the alarm signal; and
    means for terminating the communication while maintaining a current state of power to the apparatus if no response to the alarm signal is received.

11. The apparatus of claim 10, wherein the specified time is predefined based on user preferences.

12. The apparatus of claim 10, wherein the alarm signal is at least one of a unique audio signal output via once of an earpiece and an audio output device of the apparatus.

13. The apparatus of claim 10, wherein a recognized response to the alarm signal comprises at least one of pressing a particular key or key sequence on the communications device and speaking into the input of the apparatus.

14. The apparatus of claim 10, wherein if a response to the alarm signal is received, the means for monitoring of the at least one of an input and an output of the apparatus is disabled.

15. The apparatus of claim 10, wherein the means for monitoring the at least one of an input and an output of the apparatus monitors a microphone of the apparatus for voice input by a user.

16. An apparatus for detecting an unattended communication, comprising:
    means for monitoring at least one of an input and an output of the apparatus;
    means detecting an absence of the at least one of an input and an output; and
    means for activating an alarm signal based on the detection of an absence of the at least one of an input and an output, wherein the means for monitoring the at least one of an input and an output of the apparatus monitors an earpiece for a voice output by a called party.

17. An apparatus for detecting an unattended communication, comprising:
    means for monitoring at least one of an input and an output of the apparatus;
    means detecting an absence of the at least one of an input and an output;
    means for activating an alarm signal based on the detection of an absence of the at least one of an input and an output;
    means for determining if an activation of the apparatus includes an input of an emergency number; and
    means for disabling the means for monitoring, means for detecting and means for activating if the activation of the apparatus does include the input of an emergency number.

18. An apparatus for detecting an unattended communication, comprising:
    means for monitoring at least one of an input and an output of the apparatus;
    means detecting an absence of the at least one of an input and an output; and
    means for activating an alarm signal based on the detection of an absence of the at least one of an input and an output, wherein the means for monitoring the at least one of an input and an output includes means for determining if the at least one of an input and an output includes a data transmission, and means for disabling the means for monitoring, means for detecting and means for activating if the at least one of an input and an output includes a data transmission.

19. An apparatus in a mobile communications device for detecting an unattended communication, the apparatus comprising:
    a detection circuit that can detect an absence of conversation in both directions for a specified time period;
    a warning circuit to send an alarm signal and wait for a response to the alarm signal from a user of the mobile communications device; and a termination device to end the communication if no response to the alarm signal is received.

20. The apparatus of claim 19, wherein the alarm signal comprises a recognizable tone sent to a earpiece of the mobile communications device.

21. The apparatus of claim 19, wherein the alarm signal comprises a flashing light on the mobile communications device.

22. The apparatus of claim 19, wherein the alarm signal comprises a vibration of the mobile communications device.

23. The apparatus of claim 19, wherein the response to the alarm signal comprises resumed conversation on the mobile communications device.

24. The apparatus of claim 19, wherein the response to the alarm signal comprises a sequence of key presses on the mobile communications device.

25. A computer program product in a computer readable medium for detecting an unattended communication, comprising:

first instructions for initiating communication between a communication device and a remote communication device;

second instructions for monitoring at least one of an input and an output of the communications devices;

third instructions for detecting an absence of the at least one of an input and an output;

fourth instructions for activating an alarm signal based on the detection of an absence of the at least one of an input and an output;

fifth instructions for monitoring for a response to the alarm signal; and sixth instructions for terminating the communication while maintaining a current state of power to the communication device if no response to the alarm signal is received.

26. The computer program product of claim 25, wherein the specified time is predefined based on user preferences.

27. The computer program product of claim 25, wherein the alarm signal is at least one of a unique audio signal output via one of an earpiece and an audio output device of the communications device.

28. The computer program product of claim 25, wherein a recognized response to the alarm signal comprises at least one of pressing a particular key or key sequence on the communications device and speaking into the input of the communications device.

29. The computer program product of claim 25, further comprising fourth instructions for disabling the monitoring of the at least one of an input and an output of the communications device if a response to the alarm signal is received.

30. The computer program product of claim 25, wherein the first instructions for monitoring the at least one of an input and an output of the communications device includes instructions for monitoring a microphone of the communications device for voice input by a user.

31. A computer program product in a computer readable medium for detecting an unattended communication of a communication device, comprising:

first instructions for monitoring at least one of an input and an output of the communications device;

second instructions for detecting an absence of the at least one of an input and an output; and third instructions for activating an alarm signal based on the detection of an absence of the at least one of an input and an output, wherein the first instructions for monitoring the at least one of an input and an output of the communications device includes instructions for monitoring an earpiece for a voice output by a called party.

32. A computer program product in a computer readable medium for detecting an unattended communication of a communication device, comprising:

first instructions for monitoring at least one of an input and an output of the communications device;

second instructions for detecting an absence of the at least one of an input and an output;

third instructions for activating an alarm signal based on the detection of an absence of the at least one of an input and an output;

fourth instructions for determining if an activation of the communication device includes an input of an emergency number; and fifth instructions for disabling the monitoring, detecting and activating steps if the activation of the communications device does include the input of an emergency number.

33. A computer program product in a computer readable medium for detecting an unattended communication of a communication device, comprising:

first instructions for monitoring at least one of an input and an output of the communications device;

second instructions for detecting an absence of the at least one of an input and an output; and third instructions for activating an alarm signal based on the detection of an absence of the at least one of an input and an output, wherein the first instructions for monitoring the at least one of an input and an output includes instructions for determining if the at least one of an input and an output includes a data transmission, and instructions for disabling the monitoring, detecting and activating steps if the at least one of an input and an output includes a data transmission.

* * * * *

UNITED STATES PATENT AND TRADEMARK OFFICE
CERTIFICATE OF CORRECTION

PATENT NO. : 6,662,026 B1  Page 1 of 1
APPLICATION NO. : 09/671057
DATED : December 9, 2003
INVENTOR(S) : Cordray et al.

It is certified that error appears in the above-identified patent and that said Letters Patent is hereby corrected as shown below:

Col. 6, line 49: before "device" delete "communication" and insert --communications--.

Col. 6, line 66: after "or key" delete "sequcnce" and insert --sequence--.

Col. 8, line 4: after "via" delete "once" and insert --one--.

Col. 9, line 24: after "communications" delete "devices" and insert --device--.

Col. 10, line 29: before "device" delete "communication" and insert --communications--.

Col. 10, line 36: after "communication" delete "of" and insert --by--.

Signed and Sealed this

Seventeenth Day of April, 2007

JON W. DUDAS
*Director of the United States Patent and Trademark Office*